United States Patent [19]
Kelley et al.

[11] Patent Number: 5,611,562
[45] Date of Patent: Mar. 18, 1997

[54] INFLATABLE RESTRAINT MODULE WITH INFLATOR CLAMPING REACTION CANISTER

[75] Inventors: Scott A. Kelley, Algonac; Mark M. Klozik, Shelby Township; Andrew J. Smydra, Rochester, all of Mich.

[73] Assignee: TRW Vehicle Safety Systems Inc., Lyndhurst, Ohio

[21] Appl. No.: 551,996

[22] Filed: Nov. 2, 1995

[51] Int. Cl.⁶ .................................................. B60R 21/16
[52] U.S. Cl. ..................... 280/728.2; 280/728.1
[58] Field of Search ........................... 280/728.2, 728.1, 280/732, 743.1

[56] References Cited

U.S. PATENT DOCUMENTS

| | | | |
|---|---|---|---|
| 4,915,410 | 4/1990 | Bachelder | 280/728.24 |
| 5,069,480 | 12/1991 | Good | 280/743 |
| 5,186,492 | 2/1993 | Wright et al. | 280/728.2 |
| 5,263,739 | 11/1993 | Webber et al. | 280/741 |
| 5,332,256 | 7/1994 | Lauritzen et al. | 280/741 |
| 5,351,987 | 10/1994 | Donegan et al. | 280/728.2 |
| 5,387,009 | 2/1995 | Lauritzen et al. | 280/728.2 |
| 5,458,363 | 10/1995 | Garner et al. | 280/728.1 |
| 5,462,305 | 10/1995 | Hamada | 280/728.2 |

FOREIGN PATENT DOCUMENTS

| | | |
|---|---|---|
| 0620140 | 3/1994 | European Pat. Off. . |
| 0626295 | 11/1994 | European Pat. Off. . |

Primary Examiner—Christopher P. Ellis
Attorney, Agent, or Firm—Tarolli, Sundheim, Covell, Tummino & Szabo

[57] ABSTRACT

In one embodiment, an inflator module (10) includes an air bag (16), an inflator (14), and a reaction canister (12). The reaction canister (12) includes a first member (64), which has open axial ends, and second and third members (66 and 68) which are each adapted to mate with a respective one of the open ends of the first member (64). The first member (64) has an axially extending wall portion (98) which clamps the inflator (14) to prevent movement of the inflator (14) relative to the reaction canister (12). The inflator (14) is secured relative to the reaction canister (12) only by the clamping of the axially extending wall portion (98). The inflator (14) has an elongate housing (36) with inflation fluid openings (48) at one end portion (46). The axially extending wall portion (98) has projections (102) which engage the inflator (14) to space part of the wall portion (98) away from the inflator (14) and permit flow along the length of the inflator (14). The member (68) is located away from the vent openings (48) of the inflator (14) and has projections (148) to space part of the member (68) away from the inflator (14) and permit fluid flow around an end of the inflator (14). In another embodiment, an inflator (176) has a cylindrical shape. A first member (218) of a reaction canister (174) has a semi-cylindrical wall portion (236). An inner surface (238) engages the inflator (176) and clamps the inflator (176).

17 Claims, 6 Drawing Sheets

INFLATABLE RESTRAINT MODULE WITH INFLATOR CLAMPING REACTION CANISTER

BACKGROUND OF THE INVENTION

The present invention relates to an inflatable vehicle occupant protection device, such as an air bag.

A known apparatus includes an elongate inflator and an air bag, both stored within a reaction canister. The inflator is activatable to provide inflation fluid to the air bag upon the occurrence of a collision. The inflator is engaged at each of its two ends with fastening devices to hold the inflator relative to the reaction canister.

SUMMARY OF THE INVENTION

The present invention is an apparatus for helping to protect a vehicle occupant. The apparatus includes an inflatable protection device, an inflator device, and a reaction canister. The inflator device provides inflation fluid to inflate the inflatable protection device. When the inflatable protection device is inflated, it helps to protect the vehicle occupant. Preferably, the reaction canister is an assembly. The reaction canister assembly includes a first member, which has open axial ends, and second and third members which are each adapted to mate with a respective one of the open ends of the first member.

In the preferred embodiments, the first member of the reaction canister assembly has an axially extending wall portion which clamps the inflator device to prevent movement of the inflator device relative to the reaction canister assembly. Preferably, the inflator device is secured relative to the reaction canister assembly only by the clamping of the axially extending wall portion of the first member. Also preferably, the clamping is along an extent of the inflator device.

In one preferred embodiment, the inflator device has an elongate housing. The housing has a first end portion with openings for directing the inflation fluid from the inflator device, a second end portion remote from the first end portion, and an elongate surface extending parallel to an axis of the housing between the first and second end portions. The reaction canister has a first wall portion adjacent to the elongate surface of the housing with projections which engage the elongate surface to space part of the first wall portion away from the elongate surface and permit fluid flow from the first end portion of the housing along the elongate surface to the second end portion of the housing. A second wall portion of the reaction canister is adjacent to the second end portion of the housing and has projections which engage the second end portion to space part of the second wall portion away from the second end portion and permit fluid flow between the second end portion and the second wall portion toward the restraint device.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figures 1, 2:
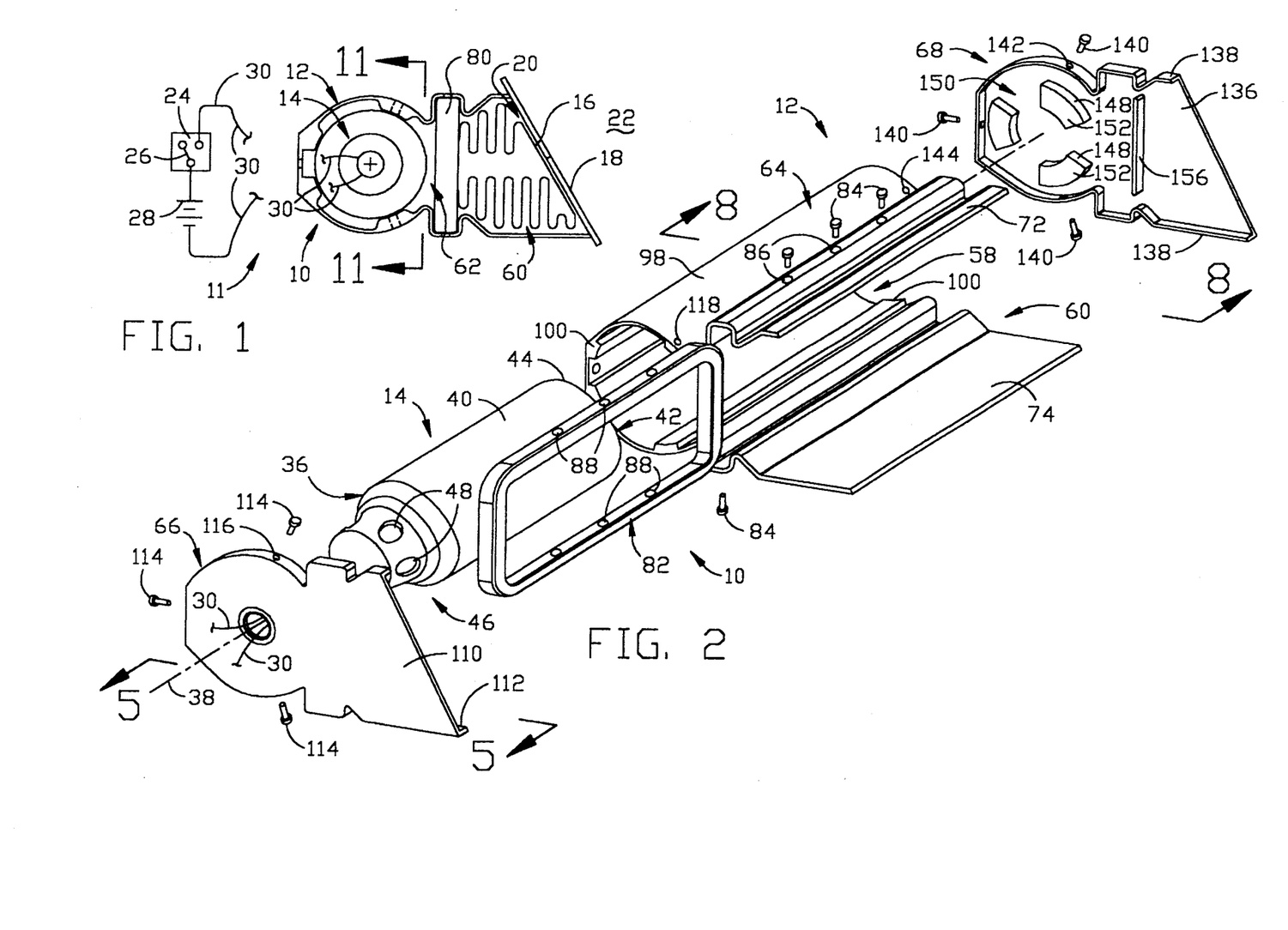
FIG. 1 is an end view of a first embodiment of an inflator module according to the present invention in a vehicle occupant protection system, with certain parts removed.
FIG. 2 is an exploded perspective illustration of the inflator module shown in FIG. 1, with certain parts removed.

An inflator module 10 according to the present invention is shown in a vehicle occupant protection system 11 (FIG. 1, schematically illustrated) in a vehicle (not shown). The inflator module 10 includes a reaction canister 12, an inflator 14, and an inflatable air bag 16. The inflator 14 and the air bag 16 are stored within the reaction canister 12 behind movable doors 18. The inflator 14 is a source of inflation fluid for inflating the air bag 16, which is extendable through a canister opening 20 into a vehicle interior 22 upon inflation.

Within the system 11, a sensor 24 (schematically shown) detects a condition which is indicative of a vehicle collision. Such a condition may be a sudden change in vehicle velocity greater than a predetermined magnitude, e.g., a sudden deceleration of the vehicle during the collision. The sensor 24 includes a switch 26 that closes in response to the detected condition so that an electrical energy signal from a power source 28 (e.g. the vehicle's battery) is transmitted along leads 30 to the inflator 14 to activate the inflator in a suitable manner.

The inflator 14 (FIG. 2) may be any suitable type of inflator which provides inflation fluid. The inflator 14 may have a pressurized stored gas, a gas generating material, or the inflator 14 may have both a pressurized stored gas and a gas generating material. Further, the internal structure of the inflator 14 may be of any suitable design. In this first disclosed embodiment, the inflator 14 has a pressurized stored gas.

The inflator 14 has an exterior housing 36 which is elongate along an axis 38. The housing 36 has a general cylindrical bottle shape, with a neck or first end portion 46 and a butt or second end portion 42. A middle portion of the housing 36 has a cylindrical surface 40 concentric about the axis 38.

The first end portion 46 has a generally cylindrical shape and has an outer diameter less than the diameter of the cylindrical surface 40. A plurality of inflation fluid openings 48 are arranged in an annular array on the first end portion 46. The second end portion 42 has a surface 44 which extends transverse to the axis 38 and transverse to the cylindrical surface 40.

The reaction canister 12 has an inflator chamber 58 and a bag chamber 60 which are adjacent to each other and which are interconnected by a connection opening 62 (FIG. 1). The canister opening 20 is at one side of the bag chamber 60 and the connection opening 62 is at the other side. The inflator and bag chambers 58 and 60 (FIG. 2) are defined by the components of the reaction canister 12, which are namely: a body 64, a first end cap 66 and a second end cap 68.

In the preferred embodiment, the body 64 (FIG. 3) is a one piece aluminum extrusion. However, the body 64 may be made of other suitable material, e.g., a polymer based material. The body 64 is elongate along on the axis 38 and has a cross-section (FIG. 4) taken perpendicular to the axis 38 which is substantially constant along the length of the body 64.

Figure 3:
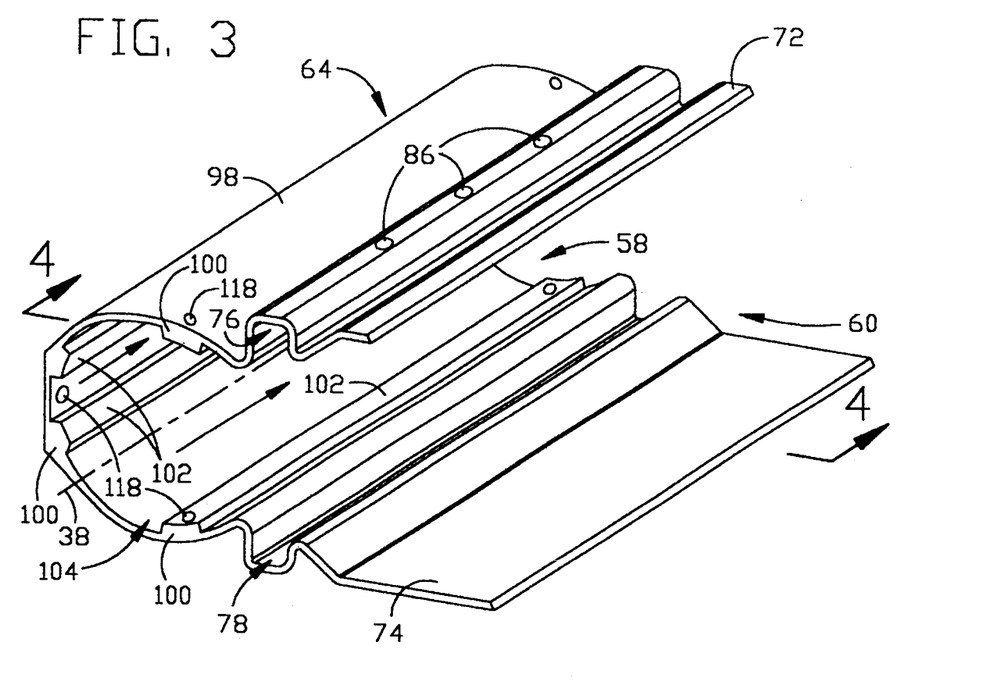
FIG. 3 is a perspective illustration of a part shown in FIG. 2.

The bag chamber 60 of the reaction canister 12 is partially defined by a top wall portion 72 and a bottom wall portion 74 of the body 64. The top and bottom wall portions 72 and 74 are elongate parallel to the axis 38. Edges of the top and bottom wall portions 72 and 74 partially define the canister opening 20. The top wall portion 72 has several segments which are either planar or curved. In addition, the top wall portion 72 has a segment located adjacent to the connection opening 62. This segment defines a ring channel 76 which faces inward and which extends parallel to the axis 38. The bottom wall portion 74 is similar to the top wall portion 72 in that it has several segments which are either planar or curved. The bottom wall portion 74 has a segment located adjacent to the connection opening 62 that defines a ring channel 78 which faces inward and which extends parallel to the axis 38.

The stored air bag 16 is located within the bag chamber 60. A mouth 80 (FIG. 1) of the air bag 16 is affixed, e.g., as by stitching, around a bag ring 82 (FIG. 2). The bag ring 82 and the attached mouth 80 (the air bag is not shown in FIG. 2) are located in the ring channels 76 and 78. The bag ring 82 is held in place by a plurality of fasteners 84 which extend through aligned holes 86 and 88 in the body 64 and the bag ring 82, respectively.

The inflator chamber 58 (FIG. 4) is partially defined by a semi-cylindrical wall portion 98 of the body 64. This wall portion 98 is elongate in the axial direction and extends about the axis 38 in a general C-shaped arc. In the preferred embodiment, this arc extends approximately 290° about the axis 38 such that the connection opening 62 has an arc length of approximately 70°. The semi-cylindrical wall portion 98 extends from the top wall portion 72 to the bottom wall portion 74 and has several segments which are either planar or curved.

Figure 4:
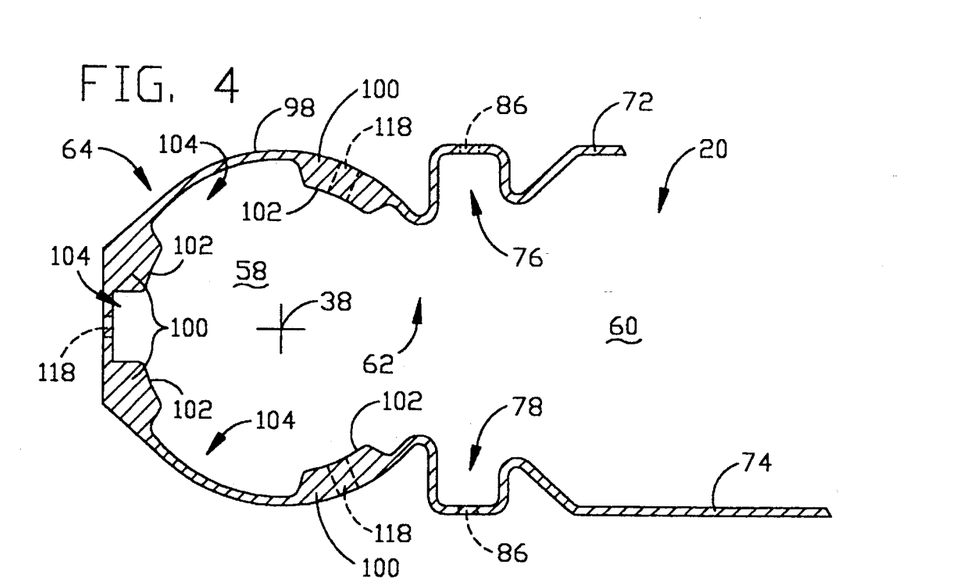
FIG. 4 is a view taken along line 4—4 in FIG. 3.

Four internal rib projections 100 are located on an inner side of the semi-cylindrical wall portion 98. Each rib projection 100 extends radially inward toward the axis 38 and also extends the length of the body 64, parallel to the axis 38. Each rib projection 100 has a radially innermost surface 102. All of these surfaces 102 are curved and lie in an arc about the axis 38 to define a discontinuous cylindrical shape. This discontinuous cylindrical shape is at the same radial distance from the axis 38 as the cylindrical surface 40 of the inflator 14. Accordingly, conformity exists between the discontinuous cylindrical shape and the cylindrical surface 40.

Grooves 104 are defined between adjacent rib projections 100 and extend along the axial length of the body 64. With the inflator 14 within the inflator chamber 58 (FIG. 1), the surfaces 102 engage the cylindrical surface 40, and a space is left open at each of the grooves 104. The cylindrical surface 40 is thus spaced away from the semi-cylindrical wall portion 98 of the body 64 at the grooves 104.

The first end portion 46 of the inflator 14 is spaced radially inward, away from the semi-cylindrical wall portion 98 because the first end portion 46 has a diameter which is less than the diameter of the cylindrical surface 40. This provides for an annular space which surrounds the first end portion 46. All of the grooves 104 are in fluid communication with this annular space.

The first end cap 66 (FIG. 2) is located at one axial end of the body 64 and closes the one axial end of the reaction canister 12. Preferably, the first end cap 66 is made of metal. The first end cap 66 has a wall 110 which extends perpendicular to the axis 38. The wall 110 has a shape which is generally the same as the profiles of the inflator chamber 58 and the bag chamber 60 taken together.

Figure 5:
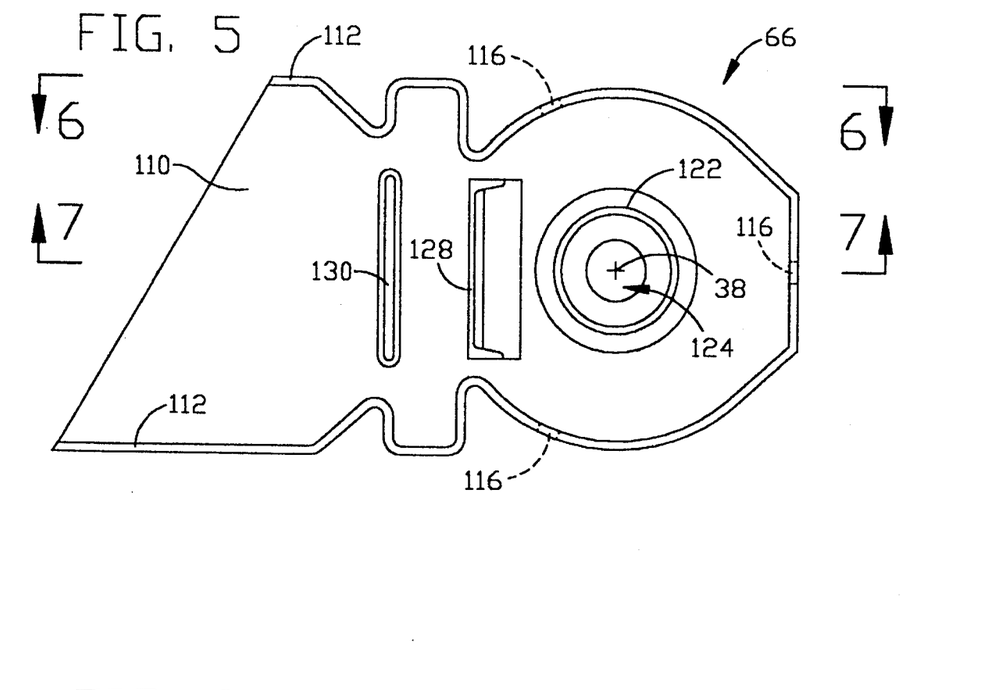
FIG. 5 is a view of an isolated part taken along line 5—5 in FIG. 2.

A lip 112 (FIG. 5) is located at an outer periphery of the wall 110. The lip 112 projects perpendicularly from the wall 110 and extends along and partially overlaps the top, bottom and semi-cylindrical wall portions 72, 74 and 98 (FIG. 2). The lip 112 is discontinuous at the canister opening 20. A plurality of fasteners 114 extend through aligned holes 116 and 118 in the lip 112 and the body 64, respectively, to fix the first end cap 66 and the body 64 together.

Figure 6:
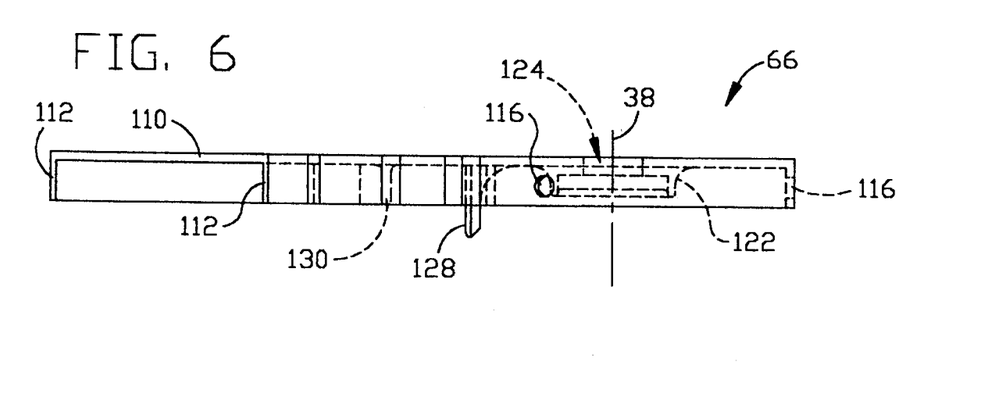
FIG. 6 is a view taken along line 6—6 in FIG. 5.
Figure 7:
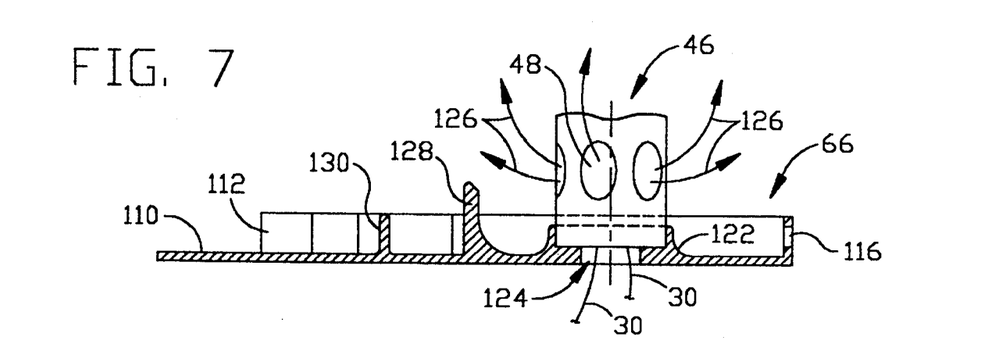
FIG. 7 is a view taken along line 7—7 in FIG. 5, with parts assembled and during an operation process.

A support cup 122 (FIG. 6) extends axially from the wall 110 and has a cylindrical shape which is centered on the axis 38. A hole 124 extends through the support cup 122 and through the wall 110 and is also axially centered. A tip of the first end portion 46 (FIG. 7) of the inflator 14 is seated in the support cup 122 and the leads 30 extend through the hole 124.

A gas diffuser projection 128 extends from the wall 110 adjacent to the support cup 122 at the connection opening 62 between the inflator and bag chambers 58 and 60. The diffuser projection 128 has a curved surface. Also, a retainer projection 130 extends from the wall 110 at the side edges of the ring channels 76 and 78 away from the inflator chamber 58. The retainer projection 130 partially overlaps the bag ring 82 and the attached mouth 80.

The second end cap 68 (FIG. 2) is located at the other axial end of the body 64 and closes that axial end of the reaction canister 12. Preferably, the second end cap 68 is made of metal. The second end cap 68 has a wall 136 which extends perpendicular to the axis 38. The wall 136 has a shape which is generally the same as the profiles of the inflator chamber 58 and the bag chamber 60 taken together.

Figure 8:
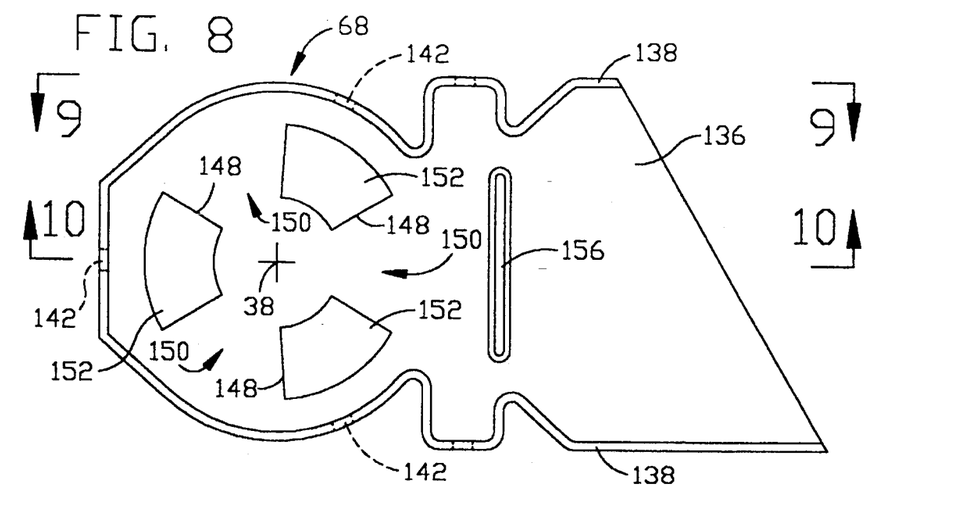
FIG. 8 is a view of an isolated part taken along line 8—8 in FIG. 2.

A lip 138 (FIG. 8) is located at an outer periphery of the wall 136 and projects perpendicularly from the wall 136. The lip 138 extends along and partially overlaps the top, bottom and semi-cylindrical wall portions 72, 74 and 98 (FIG. 2), and is discontinuous at the canister opening 20. A plurality of fasteners 140 extend through aligned holes 142 and 144 in the lip 138 and the body 64, respectively, to fix the second end cap 68 to the body 64.

Figure 9:
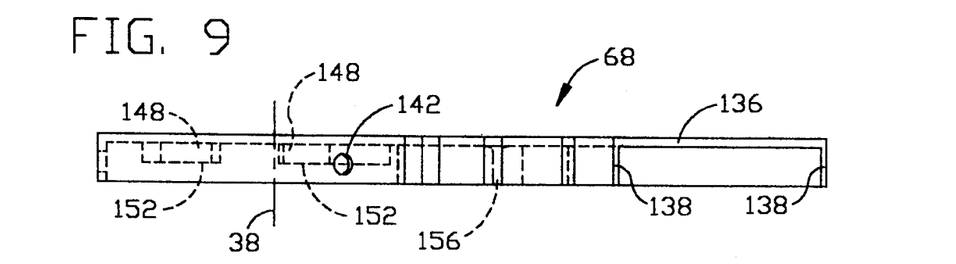
FIG. 9 is a view taken along line 9—9 in FIG. 8.

Three arc-shaped projections 148 (FIGS. 8 and 9) extend from the wall 136 in the inflator chamber 58. These projections 148 are spaced radially out from the axis 38 and are also spaced radially in from the semi-cylindrical wall 98 and the overlapping lip 138. Gaps 150 are located between adjacent projections 148.

A discontinuous ring about the axis 38 is defined by the projections 148. The gaps 150 are all in fluid communication with each other through spaces located radially inside and outside the discontinuous ring defined by the projections 148. Also, the gaps 150 and the spaces radially inside and outside the discontinuous ring are in fluid communication with the grooves 104 of the body 64.

Figure 10:
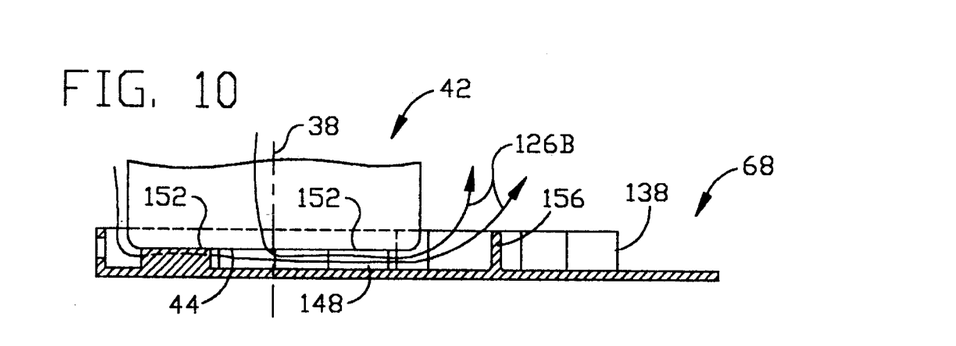
FIG. 10 is a view taken along line 10—10 in FIG. 8, with parts assembled and during an operation process.

Each of the projections 148 has a surface 152 away from the wall 136 and extending transverse to the axis 38. These surfaces 152 engage the surface 44 (FIG. 10) of the second end portion 42 of the inflator 14. Accordingly, the surface 44 is spaced from the wall 136 at the gaps 150.

A retainer projection 156 extends from the wall 136 at the side edges of the ring channels 76 and 78 away from the inflator chamber 58. The retainer projection 156 partially overlaps the bag ring 82 and the attached mouth 80.

The assembly procedure of the inflator module 10 includes the following steps. The inflator 14 is provided as a pre-assembled unit. The air bag 16 and the bag ring 82 are provided as a pre-assembled unit, with the air bag 16 attached to the bag ring 82, folded, and secured in the folded condition.

The components of the reaction canister 12 are provided unassembled. The body 64 of the reaction canister 12 is provided in a slightly more open condition than its condition subsequent to assembly of the inflator module 10. Specifically, the top wall portion 72 is located at an increased distance away from the bottom wall portion 74. Also, the C-shape of the semi-cylindrical wall portion 98 is radially expanded, with an increased mouth size of the C-shape at the location of the connection opening 62.

The inflator 14 is moved axially into the inflator chamber 58. The pre-assembled air bag unit is moved axially into the bag chamber 60, with the bag ring 82 and the attached mouth 80 being located partially within the ring channels 76 and 78. The body 64 is squeezed to a more closed condition (shown in the Figures). Specifically, resiliency of the material of the body 64 permits the body to be slightly flexed at the semi-cylindrical wall portion 98.

Accordingly, the semi-cylindrical wall portion 98 acts as a hinge interconnecting the top and bottom wall portions 72 and 74. The top wall portion 72 is moved relatively toward the bottom wall portion 74. Also, the semi-cylindrical wall portion 98 is constricted about the axis 38. The movement of the body 64 is similar to that of a clam shell.

The constriction of the semi-cylindrical wall portion 98 causes the surfaces 102 on the rib projections 100 to engage and grip the cylindrical surface 40 of the inflator 14. Accordingly, the semi-cylindrical wall portion 98 of the body 64 clamps and holds the inflator 14 against movement relative to the body 64, including axial movement. Also, the bag ring 82 and the attached mouth 80 are fully seated into the ring channels 76 and 78.

The fasteners 84 are installed between the body 64 and the bag ring 82 to secure the bag ring 82 to the body 64. Movement of the bag ring 82 and the attached mouth 80 relative to the body 64 is prevented. Also, opening of the body 64 via the hinge-like action of the semi-cylindrical wall portion 98 is prevented. Accordingly, the inflator 14 remains clamped. Separate fasteners are not used to engage the inflator 14 and fix it to the reaction canister 12.

The first end cap 66 is moved axially onto its end of the body 64. The lip 112 extends over the outside of the body 64, the retainer projection 130 extends in front of a portion of the bag ring 82 and the attached mouth 80, and the support cup 122 encircles a segment of the first end portion 46 of the inflator 14. The fasteners 114 are installed between the lip 112 and the body 64 to secure the first end cap 66 to the body.

The second end cap 68 is moved axially onto its end of the body 64. The lip 138 extends over the outside of the body 64, the retainer projection 156 extends in front of a portion of the bag ring 82 and the attached mouth 80, and the projections 148 engage the surface 44 of the inflator second end portion 42. The fasteners 140 are installed between the lip 138 and the body 64 to secure the second end cap 68 to the body.

Upon the occurrence of a vehicle collision, the switch 26 closes and the inflator 14 is activated. Inflation fluid flows radially outward from each of the inflation fluid openings 48. The structure of the reaction canister 12 and the inflator 14 cooperate to direct the flow of the inflation fluid.

Figure 11:
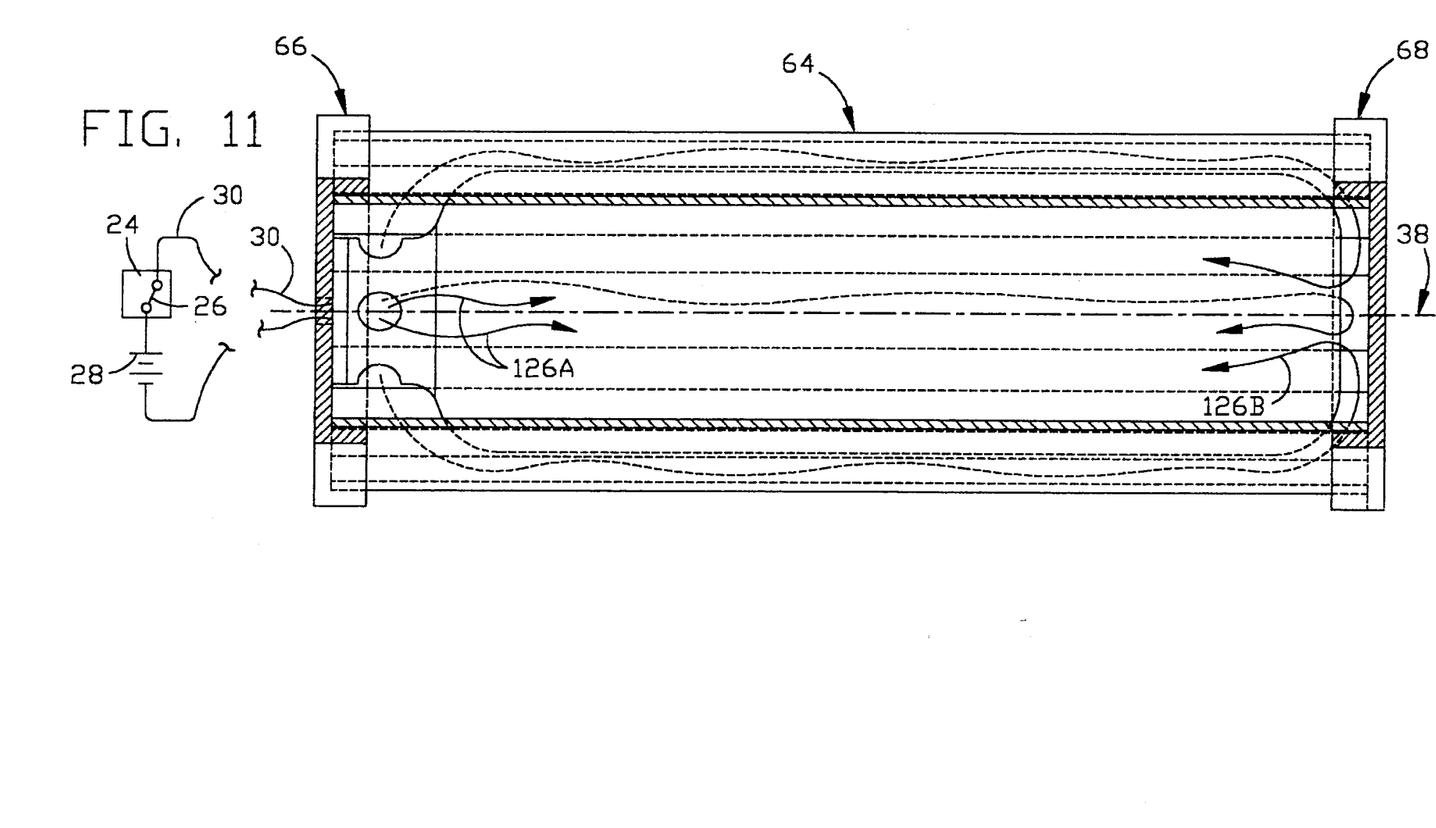
FIG. 11 is a view taken along line 11—11 in FIG. 1 during an operation process.

The support cup 122 has an axial length which is sufficiently short so as not to interfere with a flow 126 (FIG. 7) of the inflation fluid from the inflation fluid openings 48. The curved surface of the diffuser projection 128 helps to direct the flow 126 away from the wall 110. A portion 126A (FIG. 11) of the inflation fluid flows directly out from the annular space surrounding the first end portion 46 of the inflator 14 to the mouth 80 of the air bag 16. The portion 126A of the inflation fluid enters the mouth 80 of the air bag 16 at a left side, as viewed in FIG. 11, of the body 64 of the reaction canister 12.

The other portion 126B of the inflation fluid flows from the annular space surrounding the first end portion 46 into the grooves 104 for movement in the axial direction along the cylindrical surface 40. The grooves 104 thus provide flow passageways along the cylindrical wall 40 of the inflator 14 and the semi-cylindrical wall portion 98 of the body 64. At the end of the grooves 104 located away from the first end portion 46, the portion 126B of the inflation fluid moves from the grooves 104 and into the space radially surrounding the discontinuous ring defined by the projections 148. From there the portion 126B of the inflation fluid may flow around the discontinuous ring or through one of the gaps 150, across the space radially within the discontinuous ring and out through another gap 150. These spaces and gaps are thus passageways for the portion 126B of the inflation fluid to move past the surface 44 of the inflator second end portion 42 and past the wall 136 of the second end cap 68 toward the mouth 80 of the air bag 16. The portion 126B of the inflation fluid enters the mouth 80 of the air bag 16 at a right side, as viewed in FIG. 11, of the body 64 of the reaction canister 12. The portion 126B of the inflation fluid which flows along the inflator 14 through the grooves 104 provides an improved lateral (side to side) balance of inflation fluid pressure at the mouth 80 of the air bag 16. The difference between the localized pressures at the two sides (left and right, as viewed in FIG. 11) of the mouth 80 of the air bag 16 is lesser than the difference in pressures that would be present if the inflation fluid was not split int the two portions 126A and 126B.

Figure 12:
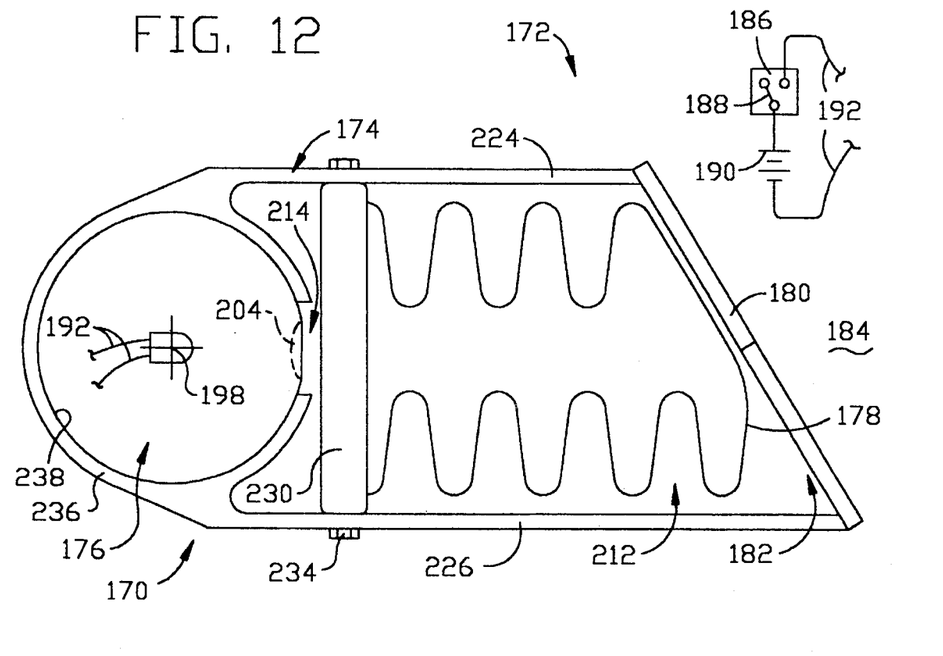
FIG. 12 is an end view of a second embodiment of an inflator module according to the present invention in a vehicle occupant restraint system, with certain parts removed.

An inflator module 170 according to a second embodiment of the present invention is shown in a vehicle occupant protection system 172 (FIG. 12, schematically illustrated) in a vehicle (not shown). The inflator module 170 includes a reaction canister 174, an inflator 176, and an inflatable air bag 178. The inflator 176 and the air bag 178 are stored within the reaction canister 174 behind movable doors 180. The inflator 176 is a source of inflation fluid for inflating the air bag 178, which is extendable through a canister opening 182 into a vehicle interior 184 upon inflation.

Within the system 172, a sensor 186 (schematically illustrated) detects a condition which is indicative of a vehicle collision. Such a condition may be a sudden change in vehicle velocity greater than a predetermined magnitude, e.g., a sudden deceleration of the vehicle during the collision. The sensor 186 includes a switch 188 that closes in response to the detected condition so that an electrical energy signal from a power source 190 (e.g., the vehicle's battery) is transmitted along leads 192 to the inflator 176 to activate the inflator in a suitable manner.

In this second disclosed embodiment, the inflator 176 has a gas generating material. However, the inflator 176 may have a pressurized stored gas, or the inflator 176 may have both a pressurized stored gas and a gas generating material. Further, the internal structure of the inflator 176 may be of any suitable design.

The inflator 176 has a generally cylindrical shaped exterior housing 196 (FIG. 13) which is elongate along an axis 198. The housing 196 has a cylindrical surface 200 concentric about the axis 198 and two end surfaces 202 (only one shown) transverse to the axis 198. The leads 192 are connected to the inflator 176 at one end surface 202. A plurality of inflation fluid openings 204 in the housing 196 are arranged in a linear array along one side of the cylindrical surface 200 between the end surfaces 202.

Figure 13:
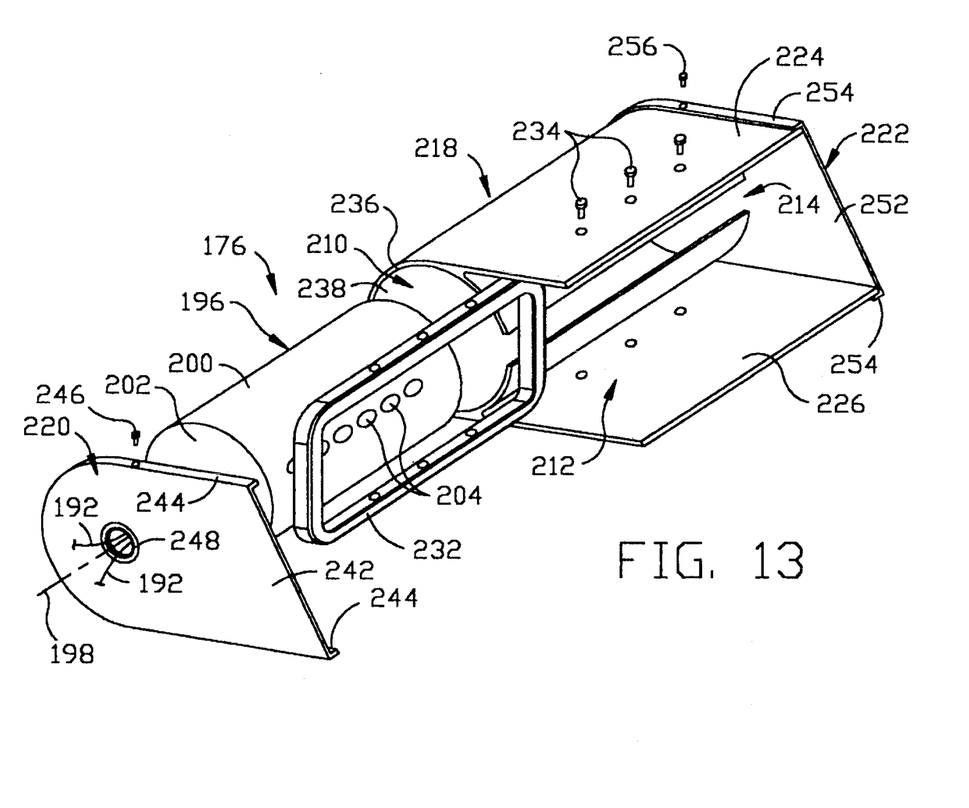
FIG. 13 is a partially exploded perspective illustration of the inflator module shown in FIG. 12, with certain parts removed.

The reaction canister 174 has an inflator chamber 210 and a bag chamber 212 for enclosing the inflator 176 and the air bag 178, respectively. The inflator and bag chambers 210 and 212 are adjacent to each other and interconnected by a connection opening 214. The canister opening 182 is at a side of the bag chamber 212 away from the connection opening 214 and the inflator chamber 210.

The inflator and bag chambers 210 and 212 are defined by the components of the reaction canister 174, which are namely: a body 218, a first end cap 220, and a second end cap 222. In the preferred embodiment, the body 218 is a one piece aluminum extrusion. However, the body 218 may be made of other suitable material, e.g., a polymer based material. The body 218 is elongate along the axis 198 and has a cross-section taken perpendicular to the axis 198 which is substantially constant along the length of the body 218.

The bag chamber 212 of the reaction canister 174 is partially defined by a top wall portion 224 and a bottom wall portion 226 of the body 218. These wall portions 224 and 226 are planar and are elongate parallel to the axis 198. Edges of the top and bottom wall portions 224 and 226 partially define the canister opening 182.

A mouth 230 (FIG. 12) of the air bag 178 is affixed, e.g., as by stitching, around a bag ring 232 (FIG. 13). The bag ring 232 and the attached mouth 230 (the air bag is not shown in FIG. 13) are located at the inner side of the bag chamber 212 adjacent to the connection opening 214. The bag ring 232 is held in place by a plurality of fasteners 234 which extend through aligned holes in the body 218 and the bag ring 232.

The inflator chamber 210 is partially defined by a semi-cylindrical wall portion 236 of the body 218. This wall portion 236 is elongate in the axial direction and extends about the axis 198 in a generally C-shaped arc.

The connection opening 214 is at the mouth of the C-shape. In the preferred embodiment, the arc of the semi-cylindrical wall portion 236 extends approximately 325° about the axis 198 such that the connection opening 214 has an arc length of approximately 35°.

The top wall portion 224 is connected to the semi-cylindrical wall portion 236 at a top of the semi-cylindrical wall portion 236 located a distance from the connection opening 214 along the arc of the semi-cylindrical wall portion. The bottom wall portion 226 is connected to the semi-cylindrical wall portion 236 at a bottom of the semi-cylindrical wall portion 236 located a distance from the connection opening 214 along the arc of the semi-cylindrical wall portion.

An inner surface 238 of the semi-cylindrical wall portion 236 is at the same radial distance from the axis 198 as the cylindrical surface 200 of the inflator 176. Accordingly, conformity exists between the surface 238 and the cylindrical surface 200. With the inflator 176 within the inflator chamber 210, the surface 238 engages the cylindrical surface 200 of the inflator and holds the inflator. The inflation fluid openings 204 of the inflator 176 are at the connection opening 214.

The first end cap 220 is located at one axial end of the body 218 and closes the one axial end of the reaction canister 174. The first end cap 220 has a wall 242 which extends perpendicular to the axis 198. The wall 242 has a shape which is generally the same as the profiles of the inflator chamber 210 and the bag chamber 212 taken together.

A lip 244 is located at an outer periphery of the wall 242. The lip 244 projects perpendicularly from the wall 242, and extends along and partially overlaps the top, bottom and semi-cylindrical wall portions 224, 226 and 236. The lip 244 is discontinuous at the canister opening 182. A plurality of fasteners 246 extend through aligned holes in the lip 244 and the body 218 to fix the first end cap 220 and the body 218 together. A hole 248 is present in the wall 242 and the leads 192 extend through the hole 248.

The second end cap 222 is located at the other axial end of the body 218 and closes that axial end of the reaction canister 174. The second end cap 222 has a wall 252 which extends perpendicular to the axis 198. The wall 252 has a shape which is generally the same as the profiles of the inflator chamber 210 and the bag chamber 212 taken together.

A lip 254 is located at an outer periphery of the wall 252 and projects perpendicularly from the wall 252. The lip 254 extends along and partially overlaps the top, bottom and semi-cylindrical wall portions 224, 226 and 236, and is discontinuous at the canister opening 182. A plurality of fasteners 256 extend through aligned holes in the second end cap 222 and the body 218 to fix the second end cap 222 to the body 218.

The assembly procedure of the inflator module 170 includes the following steps. The inflator 176 is provided as a pre-assembled unit. The air bag 178 and the bag ring 232 are provided as a pre-assembled unit, with the air bag 178 attached to the bag ring 232, folded, and secured in the folded condition.

The components of the reaction canister 174 are provided unassembled. The body 218 of the reaction canister 174 is provided in a slightly more open condition than its condition subsequent to assembly of the inflator module 170. Specifically, the top wall portion 224 is located at an increased distance away from the bottom wall portion 226. Also, the C-shape of the semi-cylindrical wall portion 236 is radially expanded, with an increased mouth size of the C-shape at the location of the connection opening 214.

The inflator 176 is moved axially into the inflator chamber 210. The pre-assembled air bag unit is moved axially into the bag chamber 212. The body 218 is squeezed to a more closed condition (shown in the Figures). Specifically, resiliency of the material of the body 218 permits the body to be slightly flexed at the semi-cylindrical wall portion 236. Accordingly, the semi-cylindrical wall portion 236 acts as a hinge interconnecting the top and bottom wall portions 224 and 226. The top wall portion 224 is moved toward the bottom wall portion 226. Also, the semi-cylindrical wall portion 236 is constricted about the axis 198.

The constriction of the semi-cylindrical wall portion 236 causes the surface 238 to engage and grip the cylindrical surface 200 of the inflator 176. Accordingly, the semi-cylindrical wall portion 236 of the body 218 clamps and holds the inflator 176 against movement relative to the body 218, including axial movement.

The fasteners 234 are connected between the body 218 and the bag ring 232 to secure the bag ring 232 to the body 218. Movement of the bag ring 232 and the attached mouth 230 relative to the body 218 is prevented. Also, opening of the body 218 via the hinging action of the semi-cylindrical wall portion 236 is prevented. Accordingly, the inflator 176 remains clamped. Separate fasteners are not used to engage the inflator 176 and fix it to the reaction canister 174.

The first end cap 220 is moved axially onto its end of the body 218, with the lip 244 extending over the outside of the body 218. The fasteners 246 are installed between the first end cap 220 and the body 218 to secure the first end cap to the body. The second end cap 222 is moved axially onto its end of the body 218, with the lip 254 extending over the outside of the body 218. The fasteners 256 are installed between the second end cap 222 and the body 218 to secure the second end cap to the body.

Upon the occurrence of a vehicle collision, the switch 188 closes and the inflator 176 is activated. Inflation fluid flows outward from each of the inflation fluid openings 204. The inflation fluid flows directly out from the inflator 176 into the open mouth 230 of the air bag 178. The air bag 178 is inflated to protect the vehicle occupant.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect a vehicle occupant, said apparatus comprising:

inflatable protection means for, when inflated, helping to protect the vehicle occupant;

inflator means for providing inflation fluid to inflate said protection means, said inflator means having a housing; and a reaction canister assembly having an axis, and comprising a first member having open axial ends, and second and third members each adapted to mate with a respective one of said open ends of said first member;

said first member of said reaction canister assembly having axially extending wall means for clamping said housing of said inflator means along an axial extent to prevent movement of said inflator means relative to said reaction canister assembly.

2. Apparatus as set forth in claim 1, wherein said wall means of said first member includes a plurality of projections which engage and clamp against said housing.

3. Apparatus as set forth in claim 2, wherein part of said wall means of said first member is spaced away from said housing and at least partially defines an axial flow passageway for inflation fluid.

4. Apparatus for helping to protect a vehicle occupant, said apparatus comprising:

inflatable protection means for, when inflated, helping to protect the vehicle occupant;

inflator means for providing inflation fluid to inflate said protection means, said inflator means having a housing; and a reaction canister assembly having an axis, and comprising a first member having open axial ends, and second and third members each adapted to mate with a respective one of said open ends of said first member;

said first member of said reaction canister assembly having axially extending wall means for clamping said housing of said inflator means along an axial extent to prevent movement of said inflator means relative to said reaction canister assembly, said third member of said reaction canister assembly having projection means for engaging said inflator means, said third member at least partially defining a passageway for inflation fluid flow across said third member.

5. Apparatus for helping to protect a vehicle occupant, said apparatus comprising:

inflatable protection means for, when inflated, helping to protect the vehicle occupant;

inflator means for providing inflation fluid to inflate said protection means; and a reaction canister assembly having an axis, and comprising a first member having open axial ends, and second and third members each adapted to mate with a respective one of said open ends of said first member;

said first member of said reaction canister assembly having axially extending wall means for clamping said inflator means to prevent movement of said inflator means relative to said reaction canister means, said axially extending wall means comprising the only means for fixing said inflator means to said reaction canister assembly.

6. Apparatus as set forth in claim 5, wherein said wall means of said first member has a plurality of projections which engage said inflator means and clamp said inflator means.

7. Apparatus as set forth in claim 6, wherein part of said wall means of said first member is spaced away from said inflator means and at least partially defines an axial flow passageway for inflation fluid.

8. Apparatus as set forth in claim 5, wherein said inflator means is generally cylindrically shaped and said wall means has surfaces which are partially cylindrical and engage said cylindrically shaped inflator means to clamp against said cylindrically shaped inflator means.

9. Apparatus for helping to protect a vehicle occupant, said apparatus comprising:

inflatable protection means for, when inflated, helping to protect the vehicle occupant;

inflator means for providing inflation fluid to inflate said protection means, said inflator means having an elongate housing, said housing having a first end portion with openings for directing inflation fluid from said inflator means, a second end portion opposite said first end portion, and an elongate surface extending parallel to an axis of said housing between said first and second end portions; and reaction canister means for enclosing said inflator means, said canister means having a first wall portion adjacent said elongate surface with projections for engaging said elongate surface and spacing part of said first wall portion away from said elongate surface to permit fluid flow from said first end portion along said elongate surface to said second end portion, and a second wall portion adjacent said second end portion with projections for engaging said second end portion and spacing part of said second wall portion away from said second end portion to permit fluid flow between said second end portion and said second wall portion toward said restraint means.

10. Apparatus as set forth in claim 9, wherein said projections of said first wall portion of said canister means engage said elongate surface with sufficient force to hold said housing relative to said canister means.

11. Apparatus as set forth in claim 9, wherein said elongate surface has a cylindrical shape about said axis, and said second end portion has a surface which extends transverse to said axis.

12. Apparatus as set forth in claim 11, wherein said first wall portion of said canister means extends adjacent to said elongate surface, and said projections of said first wall portion of said canister includes a plurality of projections angularly spaced from each other about said axis.

13. Apparatus as set forth in claim 4, wherein said projections extend along said elongate surface in directions parallel to said axis.

14. Apparatus for helping to protect a vehicle occupant, said apparatus comprising:

inflatable protection means for, when inflated, helping to protect the vehicle occupant;

inflator means for providing inflation fluid to inflate said protection means; and a reaction canister assembly having an axis, and comprising a first member having open axial ends, and second and third members each adapted to mate with a respective one of said open ends of said first member;

said first member of said reaction canister assembly having axially extending wall means for clamping said inflator means to prevent movement of said inflator means relative to said reaction canister means, said axially extending wall means comprising the only means for fixing said inflator means to said reaction canister assembly, said wall means of said first member having a plurality of projections engaging said inflator means and clamping said inflator means, part of said wall means of said first member being spaced away from said inflator means and at least partially defining an axial flow passageway for inflation fluid;

said inflator means having an elongate housing, said housing having a first end portion with openings for directing inflation fluid from the inflator means, and a second end portion opposite said first end portion, said third member of said reaction canister assembly being located adjacent to said second end portion and at least partially defining a fluid passageway for directing inflation fluid across said second end portion.

15. Apparatus as set forth in claim 14, wherein said third member includes a plurality of projections for engaging said second end portion.

16. Apparatus for helping to protect a vehicle occupant, said apparatus comprising:

inflatable protection means for, when inflated, helping to protect the vehicle occupant;

inflator means for providing inflation fluid to inflate said protection means, said inflator means having a housing; and a reaction canister assembly having an axis, and comprising a first member having open axial ends, and second and third members each adapted to mate with a respective one of said open ends of said first member;

said first member of said reaction canister assembly having axially extending wall means for clamping said housing of said inflator means along an axial extent to prevent movement of said inflator means relative to said reaction canister assembly, part of said wall means of said first member is spaced away from said inflator means and at least partially defines an axial flow passageway for directing inflation fluid toward said inflatable protection means.

17. Apparatus as set forth in claim 16, wherein said housing of said inflator means has a cylindrically shaped portion and said wall means has surfaces which are partially cylindrical and engage said cylindrically shaped portion to clamp against said cylindrically shaped portion.

* * * * *

UNITED STATES PATENT AND TRADEMARK OFFICE
CERTIFICATE OF CORRECTION

PATENT NO.　：　5,611,562
DATED　　　：　March 18, 1997
INVENTOR(S)：　Scott A. Kelley, Mark M. Klozik and Andrew J. Smydra It is certified that error appears in the above-indentified patent and that said Letters Patent is hereby corrected as shown below:

Column 11, line 19, change "4" to --12--.

Signed and Sealed this

Twenty-fourth Day of June, 1997

Attest:

BRUCE LEHMAN

*Attesting Officer*　　　*Commissioner of Patents and Trademarks*